(12) United States Patent
Schweiher et al.

(10) Patent No.: US 9,739,363 B2
(45) Date of Patent: Aug. 22, 2017

(54) GEARBOX FOR A MOTOR VEHICLE

(71) Applicant: GETRAG Getriebe- und Zahnradfabrik Hermann Hagenmeyer GmbH & Cie KG, Untergruppenbach (DE)

(72) Inventors: Mark Schweiher, Lauffen (DE); Ulrich Eggert, Viersen (DE); Andreas Hegerath, Bergheim (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 19 days.

(21) Appl. No.: 14/722,536

(22) Filed: May 27, 2015

(65) Prior Publication Data

US 2015/0345616 A1    Dec. 3, 2015

(30) Foreign Application Priority Data

May 30, 2014   (DE) ........................ 10 2014 107 659

(51) Int. Cl.
*F16H 57/04* (2010.01)
*F01M 1/12* (2006.01)

(52) U.S. Cl.
CPC ....... *F16H 57/0473* (2013.01); *F16H 57/045* (2013.01); *F16H 57/0409* (2013.01); *F16H 57/0436* (2013.01); *F16H 57/0446* (2013.01); *F16H 57/0447* (2013.01); *F16H 57/0457* (2013.01)

(58) Field of Classification Search
CPC ............... F16H 57/045; F16H 57/0447; F16H 57/0457; F16H 57/0483; F16H 57/0423

USPC ....................... 184/6.12, 6.2, 6.13
See application file for complete search history.

(56) References Cited

U.S. PATENT DOCUMENTS

| | | | | |
|---|---|---|---|---|
| 2,147,146 | A * | 2/1939 | Carlson | B60R 17/00 184/11.1 |
| 2,453,217 | A * | 11/1948 | David | F01M 11/065 137/399 |
| 2,466,320 | A * | 4/1949 | Lawrence | F16H 3/663 184/6.12 |
| 2,609,891 | A * | 9/1952 | Haas | F16N 27/00 184/6 |

(Continued)

FOREIGN PATENT DOCUMENTS

| | | |
|---|---|---|
| DE | 12 91 966 | 4/1969 |
| DE | 18 01 917 | 5/1970 |

(Continued)

OTHER PUBLICATIONS

German Search Report in co-pending German Application No. 10 2014 107 659.1, dated Jan. 29, 2015, in 7 pages.

*Primary Examiner* — Henry Liu
(74) *Attorney, Agent, or Firm* — Knobbe Martens Olson & Bear LLP (57) ABSTRACT

A gearbox for a motor vehicle. The gearbox comprises at least one fluid supply system. The fluid supply system comprises at least one pump. The fluid supply system comprises at least one fluid sump. The fluid supply system comprises at least one fluid reservoir. The fluid reservoir comprises at least a first fluid outflow leading into the fluid sump. The first fluid outflow can be controlled as a function of a state variable.

18 Claims, 7 Drawing Sheets

(56) References Cited

U.S. PATENT DOCUMENTS

| | | | | |
|---|---|---|---|---|
| 2,743,789 A * | 5/1956 | Ferguson | F16H 57/0447 | 180/53.1 |
| 3,013,574 A * | 12/1961 | Breting | F16H 61/0262 | 137/115.14 |
| 3,435,612 A * | 4/1969 | Hensler | B60K 17/10 | 123/196 R |
| 3,529,698 A * | 9/1970 | Nelson | B61C 17/08 | 184/11.2 |
| 3,625,310 A * | 12/1971 | Herrick | F16H 57/0447 | 184/13.1 |
| 3,640,359 A * | 2/1972 | Clark | B60R 17/02 | 137/115.16 |
| 3,800,913 A * | 4/1974 | Schmitt | F01M 1/12 | 184/6.13 |
| 4,018,097 A * | 4/1977 | Ross | F16H 57/037 | 184/11.2 |
| 4,199,950 A * | 4/1980 | Hakanson | F01M 5/00 | 123/179.31 |
| 4,217,926 A * | 8/1980 | Van Gorder | F16H 57/0447 | 123/196 AB |
| 4,526,054 A * | 7/1985 | Ehrlinger | F16H 57/0447 | 184/6.12 |
| 4,630,711 A * | 12/1986 | Levrai | F16H 57/0447 | 184/11.1 |
| 4,693,133 A * | 9/1987 | Tomita | F16H 57/0006 | 184/6.12 |
| 4,697,553 A * | 10/1987 | Lie | F01M 3/00 | 123/196 R |
| 4,721,184 A * | 1/1988 | Sowards | F16H 57/0447 | 184/11.1 |
| 4,750,456 A * | 6/1988 | Ladrach | F01M 11/061 | 123/196 S |
| 4,762,201 A * | 8/1988 | Malik | F01M 1/12 | 184/6.13 |
| 4,922,765 A * | 5/1990 | Hayakawa | B60K 17/344 | 184/6.12 |
| 5,101,936 A * | 4/1992 | Paredes | F01M 1/12 | 123/196 S |
| 5,115,887 A * | 5/1992 | Smith | F16H 57/0447 | 184/6.12 |
| 5,197,424 A * | 3/1993 | Blum | F01M 5/025 | 123/196 S |
| 5,279,391 A * | 1/1994 | Ward | F01M 1/12 | 184/26 |
| 5,505,112 A * | 4/1996 | Gee | F16H 57/0447 | 180/339 |
| 5,836,421 A * | 11/1998 | Leicht | F01M 5/025 | 123/196 R |
| 5,900,155 A * | 5/1999 | Bedi | C10M 175/0091 | 123/196 A |
| 6,299,561 B1 * | 10/2001 | Kramer | F16H 57/0447 | 184/13.1 |
| 6,401,870 B2 * | 6/2002 | Roy | F16N 7/38 | 184/55.1 |
| 6,938,585 B2 * | 9/2005 | Schneider | F01M 11/0004 | 123/1 A |
| 7,059,443 B2 * | 6/2006 | Kira | B60K 6/405 | 180/243 |
| 7,174,876 B2 * | 2/2007 | Suzuki | F01M 1/12 | 123/196 R |
| 7,178,426 B2 * | 2/2007 | Turner | F16H 57/0447 | 184/11.1 |
| 7,213,682 B2 * | 5/2007 | Gibson | F16H 57/0421 | 184/6.12 |
| 7,490,586 B1 * | 2/2009 | Weller | F01M 9/02 | 123/196 S |
| 7,506,724 B2 * | 3/2009 | Delaloye | F01D 25/18 | 137/38 |
| 7,793,681 B2 * | 9/2010 | Apostolides | F01M 11/0408 | 137/266 |
| 7,867,126 B2 * | 1/2011 | Nakajima | F16H 48/08 | 475/160 |
| 7,963,186 B2 * | 6/2011 | Hayes | F16H 57/0421 | 184/6.12 |
| 7,984,791 B2 * | 7/2011 | Taguchi | F16H 57/0483 | 184/11.1 |
| 8,074,753 B2 * | 12/2011 | Tahara | B60K 6/26 | 180/65.21 |
| 8,267,223 B2 * | 9/2012 | Ideshio | B60K 6/52 | 184/6 |
| 8,409,044 B2 * | 4/2013 | Hilker | F16H 57/0483 | 475/160 |
| 8,602,935 B2 * | 12/2013 | Katoh | B60K 1/00 | 184/6.12 |
| 8,657,073 B2 * | 2/2014 | Matsumoto | F16H 57/0483 | 184/11.1 |
| 8,672,094 B2 * | 3/2014 | Quehenberger | F16H 57/0419 | 184/6.12 |
| 8,746,405 B2 * | 6/2014 | Perakes | F16H 57/0409 | 184/6.12 |
| 8,875,841 B2 * | 11/2014 | Yoshimi | F16H 3/006 | 184/6.12 |
| 8,899,381 B2 * | 12/2014 | Ebihara | B60K 7/0007 | 184/6.12 |
| 9,377,099 B2 * | 6/2016 | Gianone | F16H 57/0436 | |
| 2002/0020460 A1 * | 2/2002 | Viken | F01M 11/0458 | 141/59 |
| 2002/0053489 A1 * | 5/2002 | Schnitzer | F01M 1/02 | 184/6.12 |
| 2004/0079589 A1 * | 4/2004 | Schneider | F01M 11/0004 | 184/1.5 |
| 2004/0154846 A1 * | 8/2004 | Kira | B60K 6/405 | 180/65.6 |
| 2004/0245050 A1 * | 12/2004 | Kawamoto | F01M 1/02 | 184/6.5 |
| 2005/0103570 A1 * | 5/2005 | Gibson | F16H 57/0421 | 184/6.12 |
| 2005/0183541 A1 * | 8/2005 | Maguire | F16H 57/0447 | 74/730.1 |
| 2006/0054406 A1 * | 3/2006 | Delaloye | F01D 25/18 | 184/6.11 |
| 2008/0116009 A1 * | 5/2008 | Sheridan | F01D 25/18 | 184/6.4 |
| 2008/0169030 A1 * | 7/2008 | Schoenek | F16H 57/0447 | 137/434 |
| 2008/0185541 A1 * | 8/2008 | Ukpai | F16K 31/025 | 251/11 |
| 2009/0139800 A1 * | 6/2009 | Rhein | F16H 57/0441 | 184/6.12 |
| 2009/0241645 A1 * | 10/2009 | Rains | F16N 29/00 | 73/53.05 |
| 2010/0263965 A1 * | 10/2010 | Hellenbroich | B60K 6/36 | 184/6.12 |
| 2010/0332089 A1 * | 12/2010 | Gianone | F16H 57/0447 | 701/51 |
| 2011/0174578 A1 * | 7/2011 | Richard | B60K 17/28 | 184/35 |
| 2011/0266090 A1 * | 11/2011 | Zwickler | F01M 1/16 | 184/6.22 |
| 2011/0297485 A1 * | 12/2011 | Sheridan | F01D 25/18 | 184/6.12 |
| 2012/0103728 A1 * | 5/2012 | Portlock | F01D 25/18 | 184/6.12 |
| 2012/0177520 A1 * | 7/2012 | Wilton | F04C 2/102 | 418/32 |
| 2013/0319006 A1 * | 12/2013 | Parnin | F01D 25/18 | 60/805 |
| 2013/0333508 A1 * | 12/2013 | Lundberg | F16H 61/0021 | 74/473.11 |
| 2015/0219204 A1 * | 8/2015 | Kruger | F16H 57/0409 | 184/6.12 |

FOREIGN PATENT DOCUMENTS

| | | |
|---|---|---|
| DE | 199 16 377 | 10/1999 |
| DE | 198 56 941 C1 | 2/2000 |
| DE | 103 08 560 | 9/2004 |
| DE | 102005005154 A1 | 8/2006 |

(56) References Cited

FOREIGN PATENT DOCUMENTS

| | | |
|---|---|---|
| DE | 10 2006 046 850 | 4/2007 |
| DE | 10 2007 057 984 | 6/2009 |
| DE | 102009005896 A1 | 7/2010 |
| DE | 10 2010 049 989 | 5/2012 |
| EP | 1452778 A1 | 9/2004 |
| EP | 1 855 030 | 11/2007 |
| JP | 2003166630 | 6/2003 |
| JP | 2008128338 | 6/2008 |
| WO | WO 2008/076061 | 6/2008 |

\* cited by examiner

GEARBOX FOR A MOTOR VEHICLE

CROSS-REFERENCE TO RELATED APPLICATIONS

This application claims the priority of German patent application DE 10 2014 107 659, filed on May 30, 2014.

BACKGROUND OF THE INVENTION

The present invention relates to a gearbox for a motor vehicle and to a method for operating the gearbox.

Gearboxes for motor vehicles are known which comprise elements which can be lubricated and/or cooled and/or hydraulically actuated by oil. A gearbox usually has an oil sump for this purpose. Gearboxes known from the prior art usually have a high oil level in the gearbox in order to be able to ensure a reliable oil supply in all driving states.

DE 1 801 917 discloses a gearbox which operates with oil sump lubrication, in particular a differential gear for the axial drive of motor vehicles. A space which is divided off by a dividing wall and is open in its upper region is arranged within the gearbox housing in such a way that at least a portion of the oil which is thrown up during operation collects therein, and in such a way that this space is connected to the main space though at least one opening.

DE 199 16 377 A1 discloses a change-speed gearbox. The change-speed gearbox contains a housing in the interior of which a rotating gearbox group and a driven shaft, which is connected to the gearbox, are mounted. A bulkhead wall is located in the gearbox, between the housing and the gearbox group.

DE 32 08 100 A1 discloses a gearbox housing with immersion lubrication, in particular for wheel hub gearboxes. In the state of rest, the gearbox housing is filled with oil up to a permissible filling level, which in the operating state is also entrained in the rotational direction by rotating gearbox parts, with the result that the entrained oil bears as an oil ring which bears on an inner lateral face of the gearbox housing and which has a thickness which is predefined by the filling volume, wherein some of the gearbox parts also have an immersion depth in the oil which is sufficient for immersion lubrication. The gearbox housing has means with which the immersion depth can be adapted to changed load states of the gearbox.

WO 2008/076061 A1 discloses a method for reducing the rotational resistance of gearwheels in a gearbox for a motor vehicle, and a gearbox. In the gearbox, the normal oil level ($N_1$) for operating with gearwheel combinations of the gearbox during direct-gear speed operation is temporarily reduced to a level ($N_2$) at which lower gearwheels of the gearwheel combination rotate essentially without contact with the oil in the oil sump. The oil level is increased again to the normal level ($N_1$) after the insertion of gearwheel combinations. For this purpose, an oil collecting tank is connected to the gearbox housing. The oil collecting tank not only has an upper oil inlet in the vicinity of the housing, which inlet is subjected during operation to sprayed oil from gear wheel combinations of the gearbox of the lower gear wheels which are immersed in the oil in the oil sump, but also a lower outlet in order to feed oil which has collected in the tank back to the oil sump. The outlet can be closed off during the direct-gear speed operation in order to lower the oil level in the oil sump.

EP 1 855 030 A1 discloses a fluid equalization container for arrangement in a housing of a gearbox. The fluid equalization container comprises at least one fluid inlet for taking up fluid into the fluid equalization container, and at least one fluid outlet for discharging fluid. The fluid inlet is larger than the fluid outlet, with the result that the fluid compensation container is filled during normal operation, in order to lower the fluid level in the housing. In this context, through-flow-limiting means which are dependent on the viscosity of the fluid are arranged at the fluid inlet, said through-flow-limiting means limiting the through-flow of fluid into the fluid equalization container, with the result that the fluid level is lowered less if the viscosity of the fluid exceeds a specific limiting value.

DE 103 08 560 A1 proposes an automated gearbox for motor vehicles, in particular a gearbox in the form of a countershaft gearbox having a gearbox housing, at least one power train for setting up different transmission ratios, which power train is configured to transmit force from a gearbox input to a gearbox output, wherein force-transmitting elements are lubricated from an oil sump at the bottom of the gearbox housing, and a hydraulic arrangement which has at least one pump and a valve arrangement and is configured to activate shift elements in an automated fashion in order to change the transmission ratio of the power train. In this context, a container which serves as an oil reservoir for the hydraulic arrangement is arranged laterally next to the oil sump inside the gearbox housing.

Gear wheels which are contained in gearboxes known from the prior art usually dip at least partially into oil and as a result cause splashing losses as a function of the level of the oil.

SUMMARY

Therefore, a gearbox for a motor vehicle and a method for operating the gearbox are proposed which at least largely avoid the disadvantages of known gearboxes and methods for operating a gearbox.

The gearbox according to the invention comprises at least one fluid supply system. A fluid supply system can be understood to be a system which is configured to supply at least one element of the gearbox with fluid. The term "supply" can be understood to mean, for example, supplying with fluid, in particular for the purpose of cooling and/or lubricating, and/or performing hydraulic control, in particular actuating.

The fluid can be any liquid and/or any gas. The fluid is preferably a liquid. For example, the fluid can comprise at least one lubricant and/or at least one coolant. The fluid can particularly preferably be oil, for example a lubricating oil and/or a cooling oil.

The fluid supply system can comprise at least one hydraulic actuator, for example at least one pump actuator, and/or at least one cooling oil supply and/or at least one lubricating oil supply. The fluid supply system can comprise at least one fluid line, for example an oil line. The fluid supply system can be, for example, a hydraulic system comprising, for example, at least one pump actuator, preferably two pump actuators. Furthermore, the fluid supply system can comprise at least one fluid cooling means, for example for cooling at least one clutch, preferably two clutches. The pump actuator can be, for example, a pump actuator for at least one clutch.

The fluid supply system can particularly preferably be a combination of a hydraulic system for actuating at least one clutch, preferably two clutches, and/or a cooling means, for example a cooling means for at least one clutch, preferably two clutches, and/or a lubricating means for at least part of the gearbox, for example for at least a pair of gear wheels, and/or a cooling means for at least part of the gearbox.

The fluid supply system comprises at least one pump. The pump can be a device which is configured to convert electrical energy into mechanical energy, preferably into hydraulic energy. The pump can be configured to supply a fluid, in particular oil, with a pressure and/or a volume flow.

The fluid supply system can preferably comprise three pumps. For example, the fluid supply system can comprise a pump for, in each case, one of two pump actuators, in particular clutch actuators, and a pump for cooling the clutches.

Alternatively to this, the fluid supply system can, for example, also comprise just one pump.

The pump can be, for example, a pump which is driven by at least one pump motor, preferably an electric motor. The electric motor can be, for example, a three-phase electric motor and/or an electrically commutated electric motor, in particular a brushless DC motor.

In a further alternative, the fluid supply system does not contain a pump by means of which fluid is sucked out of the fluid sump. The gearbox can in this case be, for example, a manual gearbox whose components are lubricated by means of immersion lubrication.

The fluid supply system comprises at least one fluid sump. The fluid sump can be, for example, an oil sump. The fluid sump can be a device which is configured to take up a fluid, in particular oil. The fluid sump can be configured, for example, in such a way that it takes up fluid in such a way that gear wheels of the gearbox can be supplied with fluid, for example for the purpose of cooling and/or lubricating. The fluid sump can preferably be a gearbox sump. The fluid sump can comprise, for example, at least one container and/or at least one cavity in the gearbox, preferably in a lower part of a gearbox, in which cavity the fluid, in particular the oil, collects, for example in a state of rest of the gearbox, owing to a gravitational force and/or a centrifugal force and/or a Coriolis force.

The gearbox can comprise, for example, at least one gearbox housing. The gearbox housing can comprise the fluid sump.

The fluid sump may be, for example, a depression in the gearbox housing. The depression may surround at least part of the gear wheels of the gearbox.

The fluid sump can be a space and/or a subspace of the gear box housing. The gearbox can comprise at least one gear wheel. At least part of a gear wheel can be wetted at least partially with the fluid of the fluid sump and/or can be surrounded by the fluid in the fluid sump.

The fluid supply system comprises at least one fluid reservoir. The fluid reservoir can be a container which is configured to take up and/or output and/or store fluid, in particular oil.

The fluid reservoir can preferably be configured largely separate from the fluid sump. The expression "largely separate" can be understood to mean, for example, that the fluid sump can be connected to the fluid reservoir via at least one connection for filling with fluid and/or for emptying the fluid, wherein a direct connection between the fluid sump and the fluid reservoir can be at least temporarily interrupted.

The fluid supply system can preferably comprise precisely one fluid reservoir. Alternatively to this, the fluid supply system can also comprise a plurality of fluid reservoirs, for example two fluid reservoirs or three fluid reservoirs.

The fluid reservoir comprises at least a first fluid outflow leading into the fluid sump. The first fluid outflow can be a fluid connection between the fluid reservoir and the fluid sump, for example via at least one fluid line, in particular an oil line. The fluid line can be, in particular at least partially a bore in a housing of the gearbox and/or a pipeline and/or an outflow which can be formed, for example, by housing walls.

Through the first fluid outflow, fluid can pass from the fluid reservoir to the fluid sump, for example owing to gravitational forces and/or centrifugal forces and/or Coriolis forces acting during the normal operation of the motor vehicle.

Preferably no fluid can flow through the first fluid outflow from the fluid sump to the fluid reservoir. Alternatively to this, through the fluid outflow fluid can also pass from the fluid reservoir into the fluid sump and/or fluid can pass from the fluid sump into the fluid reservoir.

The first fluid outflow can be controlled as a function of a state variable. The first fluid outflow can be controllable, for example, in any dependence with respect to the state variable. For example, at least one physical output variable at the first fluid outflow can be controlled as a function of the state variable. For example, the physical output variable can comprise at least one hydraulic variable, in particular at least one pressure and/or at least one volume flow.

For example, the dependence can be a proportional dependence and/or an inversely proportional dependence and/or an exponential dependence and/or a polynomial dependence. The dependence can also be at least partially a step-function-shaped dependence. For example, a threshold value of the state variable can be provided, wherein at a value of the state variable below the threshold value the physical output variable is adjusted to a first value, and wherein at a value of the state variable above or equal to the threshold value the physical output variable is adjusted to a second value. For example, when the threshold value is undershot the fluid outflow can be closed or become closed, and when the threshold value is reached and/or overshot, the fluid outflow can be open or be opened and therefore a volume flow can be 0 or a volume flow can be maximized.

The state variable can in principle be any physical variable and/or any chemical variable and/or any technical variable. The state variable can comprise at least one variable selected from: a temperature, a degree of toughness, a pressure, a volume flow, a hydraulic resistance, a flow rate, a torque. The state variable can preferably be an observable. The state variable can be, for example, an observable at any point on the gearbox.

The state variable can preferably be an observable of the fluid supply system.

The gearbox can comprise at least one clutch. The clutch can be a device which is configured to permit a transmission of force between at least two shafts in a reversible fashion. The expression "reversible" can be understood to mean that a transmission of force between the two shafts can be permitted and/or prevented as frequently as desired, for example under the control of a driver and/or controlled by an automatic controller.

The clutch can preferably be a wet clutch. A wet clutch can preferably be supplied with fluid in such a way that it is cooled by the fluid. In addition, the wet clutch can be actuated by means of fluid, in particular the wet clutch can be opened and/or closed under hydraulic actuation, in particular in such a way that a transmission of force between the two shafts is permitted or prevented.

The gearbox can preferably comprise two clutches. The gearbox can preferably be a twin clutch gearbox.

The fluid supply system can preferably comprise three lines.

The fluid supply system can comprise, for example, in each case a line for in each case one clutch for actuating and in each case one line or a common line for cooling the two clutches.

Each line can, for example, comprise at least one pump. For example, each line can, comprise a fluid reservoir. Preferably, just one line for cooling the clutches can comprise a fluid reservoir. Each line can be supplied, for example, with fluid from the fluid sump.

The fluid supply system can be configured to cool at least one clutch and/or to actuate at least one clutch, preferably two clutches.

The state variable can be a fluid supply variable. The fluid supply variable can comprise any physical and/or chemical and/or technical variable.

The fluid supply variable can, for example, be influenced at least partially by the pump, in particular by a method of functioning of the pump.

The fluid supply variable can comprise at least one variable selected from a fluid pressure, in particular an oil pressure, for example a cooling oil pressure, preferably an oil pressure of a clutch variable, a fluid volume flow, in particular an oil volume flow, a rotational speed of the pump, a rotational speed of a pump motor, a rotational direction of the pump, a rotational direction of the pump motor, a fluid requirement, in particular an oil requirement, and a ram pressure (banking-up pressure), for example a ram pressure of a clutch cooling oil line.

The fluid supply variable and/or the state variable can be, in particular, a variable which is present, for example, between the fluid sump and the clutch, preferably between the pump and the clutch and/or at the pump.

The first fluid outflow can be actively and/or passively controllable. The expression "actively controllable" can be understood to mean, for example, that the state variable and/or the fluid supply variable are firstly sensed and the fluid outflow is adjusted by means of one element. The active control can be carried out, for example, by means of at least one solenoid valve.

The expression "passively controllable" can be understood to mean, for example, that the state variable and/or the fluid supply variable are not actually sensed in order to control the first fluid outflow but instead can contribute directly to the adjustment. Passive control can be controlled directly, for example, by a pressure in a line, for example in a cooling oil duct.

The first fluid outflow can comprise at least one orifice and/or at least one restrictor and/or at least one valve, in particular at least one temperature-dependent valve and/or at least one pressure-dependent valve and/or at least one temperature-dependent and pressure-dependent valve. The restrictor and/or the valve and/or the orifice can be elements which are configured to influence at least one physical variable, preferably a volume flow and/or a pressure of the fluid in the first fluid outflow.

The restrictor can be, for example, an element which is configured to restrict and/or accelerate a throughflow of fluid. For example, the restrictor can be a constriction, in particular a constriction in a throughflow area of a pipe and/or of a line, for example of an oil line.

The orifice can be an element which can reduce a throughflow area over at least one line section of a line.

The valve can be, for example, an element for shutting off and/or adjusting a throughflow of fluid. The valve can comprise at least one closure part. In a valve, for example a throughflow of fluid can be reduced and/or increased and/or interrupted and/or permitted, for example in that the closure part is shifted over at least a part of a throughflow area.

The valve can, for example, change a throughflow, in particular a volume flow of fluid, in particular in a variable fashion.

The temperature-dependent valve can be, in particular, a valve which at least partially opens or closes, for example, as a function of a temperature, in particular a temperature of the fluid. The temperature-dependent valve can be, for example, an actuable discharge valve with a temperature-dependent pressure threshold.

The valve may be, for example, a stop valve, in particular a butterfly valve and/or a non-return valve, for example a releasable non-return valve and/or a directional control valve, in particular a slider valve and/or a seat valve and/or a solenoid valve, in particular a valve with an electromagnetic drive, for example an active solenoid valve.

The fluid supply system can comprise at least a second fluid outflow. The second fluid outflow can be a fluid outflow leading from the fluid reservoir into the fluid sump, The second fluid outflow can be configured so that in the uncontrolled state it allows fluid to flow out from the fluid reservoir into the fluid sump.

The second fluid outflow and/or the first fluid outflow can comprise, in particular, a line from the fluid reservoir to the fluid sump.

The first fluid outflow and/or the second fluid outflow can be configured, for example, as drainages.

The second fluid outflow can preferably be non-controlled. The second fluid outflow can preferably be non-adjustable.

The first fluid outflow and/or the second fluid outflow can be configured to make available a large amount of fluid in the fluid sump, for example after long immobilization times.

Alternatively or additionally, the first fluid outflow and/or the second fluid outflow can be configured to empty the fluid reservoir, for example to leave it empty, in the event of a failure of an open-loop control system and/or in the event of a failure of a closed-loop control system of the gearbox and/or of the first fluid outflow.

The first fluid outflow and/or the second fluid outflow can be configured, in particular, in such a way that in the case of long immobilization times of the gearbox the entire fluid of the gearbox, in particular the entire fluid volume, can run back into the fluid sump and/or enough fluid, in particular oil, is available in the event of a cold start.

For example, the first fluid outflow and/or the second fluid outflow can comprise at least one orifice, preferably a small orifice.

The orifice, in particular the small orifice, can have, for example, an opening with a cross-sectional area between 100 $\mu m^2$ and 1 $cm^2$, preferably between 0.1 $mm^2$ and 2 $mm^2$, particularly preferably 0.5 $mm^2$.

The second fluid outflow can preferably not comprise an adjusting element. The second fluid outflow can be configured, for example, without a valve.

Alternatively or additionally, the second outflow can comprise at least one restrictor and/or at least one valve and/or at least one orifice.

The gearbox can comprise at least one sensing device for sensing the state variable, preferably for sensing the fluid supply variable. The sensing device may in principle be any sensing device which is configured to sense the state variable, preferably the fluid supply variable. The sensing device may be, for example at least one sensor and/or at least one measuring device.

The gearbox can comprise, in particular, at least one pressure sensor, for example at least one pressure sensor for sensing a cooling fluid pressure, and/or at least one rotational speed sensor and/or at least one rotational direction sensor.

The pressure sensor may in principle be any device which is configured to sense at least one pressure, preferably at least one cooling fluid pressure. The pressure sensor may be, for example, a device which utilizes the piezo-electric effect in order to convert the pressure of a fluid, for example oil, into an electrical signal. Alternatively or additionally, the pressure sensor can comprise at least one diaphragm. The pressure sensor can be configured to determine a pressure of the fluid from a change in an electrical resistance at an element on the diaphragm.

The rotational speed sensor and/or the rotational direction sensor may be, for example, a device which is configured to sense at least one rotational speed and/or at least one rotational direction of a motor, for example of an electric motor. The rotational speed sensor and/or the rotational direction sensor may be preferably a device which is configured to sense a pumping direction of the pump and/or a volume flow through the pump.

Alternatively or additionally, the gearbox, in particular the fluid supply system, can comprise at least one temperature sensor. The temperature sensor can be configured to sense at least one temperature, preferably at least one temperature of the fluid, in particular of the oil. The temperature sensor can be configured to correct, by means of a temperature model, the state variable and/or the fluid supply variable, in particular with respect to an influence of temperature fluctuations and/or an influence of a temperature-dependent degree of viscosity of the fluid, in particular a temperature-dependent degree of viscosity of the oil.

The temperature sensor can in principle be arranged at any point on the temperature on the fluid supply system, for example in the vicinity of the valve of the first fluid outflow.

The fluid reservoir can, for example, be configured in such a way that it is possible to prevent the clutch or the pump from drawing in air. For example, the device according to the invention can prevent the pump from drawing in air. The first fluid outflow and/or the second fluid outflow can be configured in such a way that the pump preferably never draws in air.

The fluid reservoir can comprise at least one opening for filling the fluid reservoir. The opening in principle may be any opening. For example, the fluid reservoir may be an upwardly open cavity and/or an upwardly open container. The expression "upwardly" can be understood within the scope of the present invention to mean, for example, a direction which can be oriented essentially opposite to forces acting on the fluid, in particular on the oil, in particular the gravitational force and/or centrifugal forces during normal operation of the motor vehicle.

The fluid reservoir can be filled by means of sprayed fluid, in particular sprayed oil, and/or by means of fluid diverted by at least one orifice, in particular diverted oil. The fluid reservoir can be filled, in particular, through the opening, for example with sprayed fluid and/or with fluid diverted by at least one orifice. The sprayed fluid may be oil which is prayed out of the fluid sump and/or thrown off by the clutch by at least one rotating gear wheel.

Alternatively or additionally to filling by means of sprayed fluid, the fluid reservoir can be filled by fluid diverted by at least one orifice. The orifice may be in principle be any orifice, for example an orifice such as that described above. For example, the orifice can be orifice which can serve to adjust a pressure, for example a pump pressure, and/or a volume flow. The orifice may be an orifice which can be arranged, for example, in a bypass between a fluid feed line leading to the clutch and the fluid sump, in particular in order to generate a leakage fluid flow, in particular a leakage oil flow.

The fluid supply system may comprise at least one filter, the filter may be any element which is configured to remove and/or retain impurities and/or suspended matter, carried along with the fluid. The filter, can, for example, be configured to filter dirt out of the fluid.

The filter can be arranged, for example, between the fluid sump and the pump and/or between the pump and the clutch and/or between the pump and the wheel set and/or between the fluid reservoir and the fluid sump and/or between the fluid sump and the opening of the fluid reservoir.

The filter can, for example, be arranged upstream of an orifice in order to prevent the orifice becoming blocked. Alternatively or additionally, the filter can be arranged upstream of the pump in order to prevent wear of the pump.

The expression: "upstream of" can be understood within the scope of the present invention to mean a direction opposed to the direction of flow of the fluid, for example when fluid is being sucked in from the fluid sump to the clutch.

The filter can serve, in particular, to filter the fluid. The filter can comprise, for example, at least one fine grill (or mesh), in particular a grill made of metal. The grill may have, for example, a mesh diameter of 2 mm to 1 μm, preferably from 1 mm to 10 μm, particularly preferably from 500 μm to 100 μm.

The filter may preferably be a pump protection intake filter, configured, for example, as a screen, with a mesh width of 150 μm to 400 μm.

The gearbox can comprise at least one gearbox housing. The gearbox housing may be understood to be a device which at least partially surrounds at least some of the elements of the gearbox, for example the clutch and/or the fluid supply system and/or the wheel set. The fluid reservoir may be at least partially integrated into the gearbox housing. For example, the fluid reservoir may be arranged at least partially also outside the gearbox housing.

The gearbox can comprise at least one actuator. The actuator can be connected to the fluid supply system, in particular to the valve, via at least one interface. The actuator may have, for example, one or more electronic components. The actuator may be implemented, for example, entirely or partially as an application-specific integrated circuit and/or can be integrated entirely or partially into an engine controller. Alternatively or additionally, the actuator can be integrated entirely or partially into the wheel set and/or into the fluid supply system.

The actuator may comprise, for example, at least one data processing device. The actuator may be integrated entirely or partially into at least one other actuator. The actuator can be operable, for example, by means of an on-board power system.

The actuator can comprise at least one control output. The control output can be an element which is configured to transmit information, in particular instructions from the actuator, to at least one element of the gearbox. The control output can be an analogue and/or digital output.

The gearbox can be configured in such a way that the control output simultaneously controls the pump and the first fluid outflow.

The pump can be, for example, a pump as described in the German patent application by the applicant of the present application which was published after the priority date of the present application and has the number DE 10 2013 110 400.2, or in DE 10 2011 122 642 A1.

The pump can be configured, in particular, in such a way that it pumps the fluid in the same direction, preferably from the fluid sump to the clutch, irrespective of a rotational direction of the three-phase current.

The fluid supply system can be configured to transport fluid from the fluid sump to the clutch. The filter can preferably be arranged upstream of the pump in the direction of flow. At least one rotational bushing can be arranged downstream of the pump in the direction of flow. The clutch can preferably be arranged downstream of the rotational bushing in the direction of flow. The filter and/or the pump and/or the rotational bushing and/or the clutch can be connected at least partially via at least one line. The line can be, for example, a bore, in particular in the gearbox housing, and/or at least one pipeline. The fluid reservoir can be connected at least partially, in particular fluidically, via at least one line, in particular at least one bore and/or at least one pipeline, via the first fluid outflow and/or via the second fluid outflow.

The fluid supply system can additionally comprise at least one leakage line leading to the sump, preferably downstream of the pump in the direction of flow. The leakage line can comprise at least one orifice and/or at least one filter.

In a further aspect of the present invention, a method for operating the gearbox is proposed. The gearbox comprises at least one fluid supply system, in particular a fluid supply system as described above. The fluid supply system comprises the at least one pump. The fluid supply system comprises the at least one fluid sump. The fluid supply system comprises the at least one fluid reservoir. The fluid reservoir comprises the at least one first fluid outflow leading into the fluid sump. The first fluid outflow is controlled as a function of the state variable.

The method can preferably be carried out at least partially by the actuator.

The fluid outflow can preferably be controlled as a function of the fluid supply variable, for example actively or passively.

In the method according to the invention, in particular a portion of the fluid, for example a gear oil, can be retained in the fluid reservoir. After relatively long immobilization phases and/or when there is a large fluid requirement, in particular when there is a large oil requirement, for example for cooling the at least one clutch, fluid can be discharged out of the fluid reservoir into the sump, in particular through the first fluid outflow and/or through the second fluid outflow.

For example, at least a portion of the fluid in the gearbox can be stored in the fluid reservoir. The fluid reservoir can be filled by collected sprayed fluid from a wheel set and/or from a clutch device, in particular from the clutch, of the gearbox.

The gearbox described above for a motor vehicle and the method described above for operating the gearbox have numerous advantages over known devices and methods.

For example, a fluid level, in particular the oil level in the fluid sump, can be adapted to states of the gearbox. The fluid level in the fluid sump can be lowered in an at least chronologically limited fashion and/or reversibly. For example, the fluid level in the fluid sump can be adapted to the fluid requirement. In particular, the fluid level in the gearbox sump can be lowered during normal operation. The normal operation can be, for example, a state of the gearbox in which the maximum quantity of fluid, in particular a maximum quantity of oil, is not required for cooling and/or actuating and/or lubricating. During the normal operation, the motor vehicle can run through, for example, normal driving situations.

The fluid level can be lowered, for example, in normal driving situations, in particular in such a way that gear wheels plunge less in the fluid. A non-maximum fluid level, in particular a reduced fluid level, can cause fewer spraying losses, in particular at the gear wheels.

In order, for example, nevertheless to be able to ensure the reliability of a supply with fluid, in particular an oil supply, it is possible, in the case of a large oil requirement such as may be necessary, for example for cooling a clutch, in particular a wet multi-plate clutch, to make available a relatively large quantity of fluid, in particular oil, for sucking in, than for example, during normal operation.

A gearbox efficiency level can preferably be increased by a gearbox according to the invention and/or by the method according to the invention.

In the case of a high fluid requirement, for example in the case of active cooling of the clutch, in particular of an active clutch-cooling system, the fluid level in the fluid sump may be at a maximum and/or the entire fluid volume can be made available.

Furthermore, in particular when a pump as described in DE 10 2013 110 400.2 is used, the fluid supply system may be activated by precisely just one control outlet of the actuation system. A control outlet which is separate from a pump actuation outlet for the valve is not necessary as a result of the device according to the invention and the method according to the invention.

The gearbox according to the invention can preferably be configured in such a way that in the event of a failure of the actuation system the fluid reservoir can run empty. As a result, the function and/or safety can be influenced positively.

The gearbox according to the invention can preferably be a gearbox with a wet clutch. Furthermore, the gearbox can preferably be a gearbox with at least one requirement-driven cooling fluid supply by means of an electric motor.

Consequently, the gearbox according to the invention preferably contains an additional fluid reservoir as well as the fluid sump. The fluid reservoir is preferably filled with sprayed fluid. The sprayed fluid can be made to circulate, for example, by a centrifugal effect, coming, for example, from a wheel set or from a clutch. The fluid reservoir is preferably open at the top. Alternatively or additionally, the fluid reservoir is preferably connected to a fluid channel in such a way that sprayed fluid can be fed by means of gravity. An additional second, preferably direct, supply of fluid into the fluid reservoir is generally conceivable via a pump, which can preferably be provided specially for this purpose. In this embodiment it is, if appropriate, possible to fill the fluid reservoir quickly without using rotating parts, and possibly via an orifice, in order to lower the level of the fluid sump quickly.

The first fluid outflow can have, for example, two positions, wherein the first fluid outflow is connected, for example, to the fluid sump via a valve or the like. A second fluid outflow is preferably embodied here in such a way that fluid can flow out of the fluid reservoir owing to gravity. In one position, the outflow preferably occurs here by means of a certain degree of leakage (in the manner of an orifice). For example, a valve which connects the fluid reservoir and the fluid sump may be incompletely closable in a closed position, for example may be embodied with a shutter gap with a stop. In the other position, a relatively large or maximum outflow quantity is made possible. One of the positions can be configured here without having to feed in energy from the outside, such as, for example, in the case of a solenoid valve. The other position can be configured here, for example, if energy is fed into the valve. The feeding in of energy can comprise, for example, energization of a valve which can be controlled magnetically or in some other way. The energization can originate, for example, from an actuator which energizes the valve as a function of any event or as a function of any state variable.

In other words, the second fluid outflow can be, for example, a bore or orifice which is formed in the valve body in such a way that the valve can never close in an entirely sealed fashion. The valve body can be, for example, a shutter or a piston.

The valve which connects the fluid reservoir and the fluid sump is preferably embodied as a "normally closed" valve, and is consequently in a closed state (which, as mentioned above, can be embodied in such a way that is never completely closing) when it is not activated with extraneous energy.

In this embodiment, such a valve does not consume any energy during normal operation. The normal operation is, for example, an operating state in which a drive engine of the motor vehicle is switched on, the gearbox is operationally warm, the fluid reservoir is filled and/or the level of the fluid sump is lowered for energetic reasons in order to avoid spraying losses.

If the motor vehicle is deactivated, for example the drive engine is switched off, the reservoir can preferably still empty, specifically via the second fluid outflow, which may be embodied, for example, by means of the bore or orifice in the valve body.

If the valve which connects the fluid reservoir and the fluid sump is supplied with extraneous energy, the valve can be placed in an opened state, with the result that a larger quantity can be discharged from the fluid reservoir than would be possible as a result of the preset leakage of a second fluid outflow.

Instead of the valve described above, which is normally prestressed in the "normally closed" manner, the valve can also be embodied as a "normally open" valve, but this could be energetically somewhat more costly.

An event or a state variable for activating the valve or the first fluid outflow can be, for example, a temperature, an "activation" pressure, a cooling fluid request or a cooling fluid pressure, a gear speed shifting request or some other driving state (boosting or the like), or a combination thereof. The outflow can be implemented by means of a simple ON/OFF valve which is preferably pulsed, i.e. can be regulated in a quasi-infinitely variable fashion. In addition the outflow can be formed by an infinitely adjustable valve which contains an infinitely large number of settings.

In at least one operating state, the quantity of sprayed fluid which occurs is greater than the leakage made available by a second fluid outflow. As a result, the fluid reservoir can be reliably filled in this operating state. In a further preferred variant, the outflow quantity is greater than the quantity of sprayed fluid which occurs when the first fluid outflow is opened, with the result that the fluid reservoir can be reliably emptied. The "height positions" of the first and second fluid outflow can be identical but can also be different. For example, the second fluid outflow could be arranged at a higher position than the first fluid outflow. In this case the fluid reservoir can only be adjusted to a relatively low level or completely emptied by opening the first fluid outflow. Alternatively it is, however, also possible to arrange the second fluid outflow lower than the first fluid outflow, with the result that leakage is always possible via the second fluid outflow independently of the position of the first fluid outflow.

The first fluid outflow can be controlled as a function of a state variable. The term control preferably includes here feedback-free control or control with feedback, which can also be referred to as a closed-loop control. The control can consequently be active or passive.

The fluid reservoir is preferably filled exclusively passively by sprayed fluid.

The process of opening the first fluid outflow for the purpose of discharging fluid from the fluid reservoir preferably serves not only to lubricate gear wheels of the gearbox but preferably also serves to make available a sufficient level in the fluid sump so that a cooling fluid pump, preferably for a wet-running friction clutch, cannot empty but instead sufficient fluid can always be sucked in by this cooling fluid pump.

In other words, the method according to the invention can be configured in such a way that by controlling the first fluid outflow the level of the fluid sump is kept at such a level that a cooling fluid pump can always suck fluid out of the fluid sump in operating states in which cooling of a component such as a friction clutch is necessary.

Consequently, the first fluid outflow is preferably controlled on the basis of the fluid requirement of such a cooling fluid pump. The state variable by means of which the first fluid outflow can be controlled can consequently also be frictional energy which is introduced into a friction clutch and which arises from the driving situation and the respective gearbox function. In turn, the cooling requirement and consequently the volume flow which is to be sucked in by the cooling fluid pump, and which is preferably to be compensated by controlling the first fluid outflow, also arises from the frictional energy.

However, the opening of the first fluid outflow does not necessarily occur in accordance with the function of the cooling fluid pump. This is because such a cooling fluid pump can preferably be operated in an infinitely variable fashion at various rotational speeds by means of its own electric motor, specifically depending on the cooling requirement which is present.

The cooling fluid pump is embodied in one embodiment as reversible or as a pump with a reversible pumping direction, as is described, for example, in document DE 102013110400. In this context, a portion of delivered fluid can be conducted, in a reverse setting, to a hydraulic control valve which connects the fluid reservoir to the pump sump. In this case, the control valve can be actuated hydraulically. The features which are mentioned above and which will be explained below can be used not only in the respectively specified combination but also in other combinations or alone without departing from the scope of the present invention.

BRIEF DESCRIPTION OF THE DRAWINGS

Embodiments of the invention are illustrated by way of example in the figures and are explained in more detail in the description of the figures. In the drawings.

DESCRIPTION OF PREFERRED EMBODIMENTS

Figure 1:
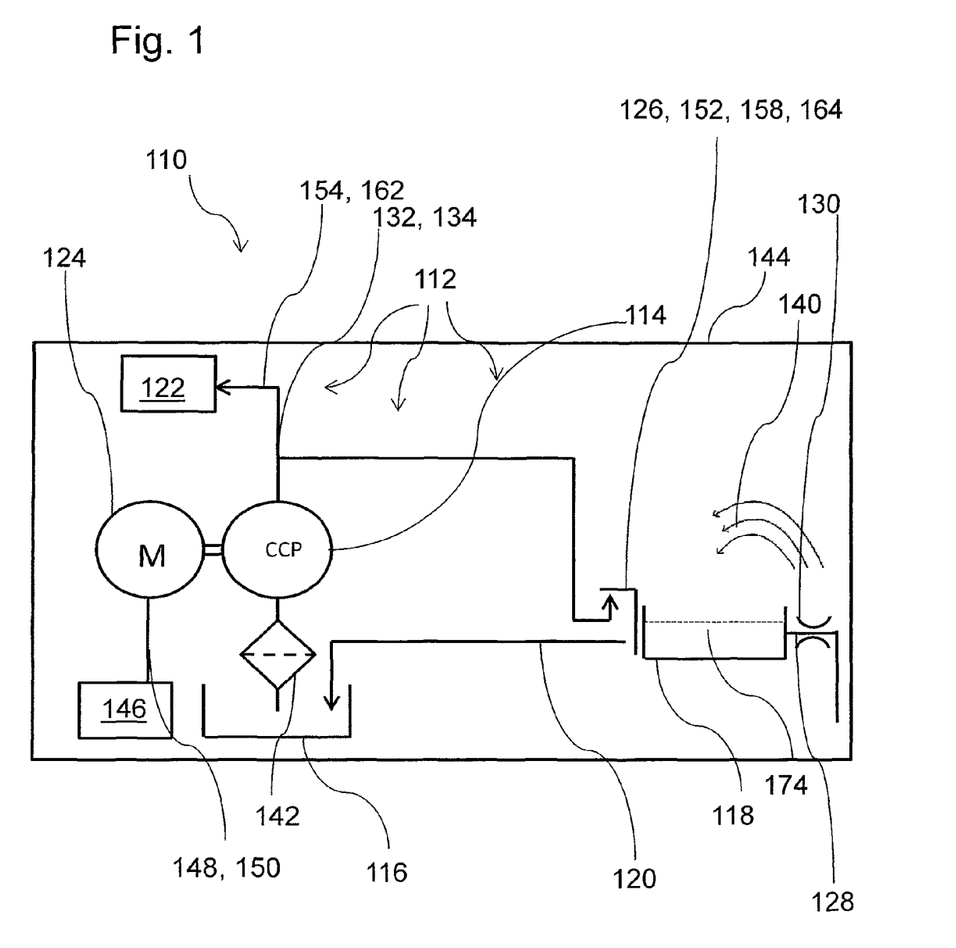
FIG. 1 shows a schematic illustration of a first exemplary embodiment of a gearbox according to the invention.

FIG. 1 illustrates a first exemplary embodiment of a gearbox 110 according to the invention.

The gearbox 110 comprises at least one fluid supply system 112. The fluid supply system 112 comprises at least one pump 114.

The fluid supply system 112 comprises at least one fluid sump 116. The fluid supply system 112 comprises at least one fluid reservoir 118. The fluid reservoir 118 comprises at least a first fluid outflow 120 leading into the fluid sump 116. The first fluid outflow 120 can be controlled as a function of a state variable.

The fluid sump 116 can be, for example, a gearbox oil sump.

The fluid reservoir 118 can in particular be configured to store at least a portion of a volume of fluid 174 in the fluid reservoir 118. The fluid sump 116 can be configured to store and/or contain at least a further portion of the volume of fluid 174.

The fluid reservoir 118 can be, for example, at least one container.

The gearbox 110 can comprise at least one clutch 122. The gearbox 110 can preferably comprise at least two clutches 122. The pump 114 can be, for example, a clutch cooling pump (CCP), in particular a pump 114 for cooling at least one clutch 122.

Alternatively or additionally, the pump 114 can also be a pump 114 for actuating the clutch 122. The gearbox 110 can particularly preferably comprise a pump 114 for cooling a clutch, and additionally preferably two pumps 114 for actuating in each case one of two clutches 122.

The state variable can be a fluid supply variable. The fluid supply variable can comprise at least one variable selected from a fluid pressure, a fluid volume flow, a rotational speed of the pump 114, a rotational speed of the pump motor 124, a rotational direction of the pump 114, a rotational direction of the pump motor 124, a fluid requirement and a ram pressure. The first fluid outflow 120 can be controllable actively and/or passively.

For example, the first fluid outflow 120 can be controlled actively, in particular by means of a solenoid valve. Alternatively or additionally, the first fluid outflow 120 can be controlled passively, in particular by means of a pressure in a cooling fluid duct.

The first fluid outflow 120 can comprise at least one orifice 130 and/or at least one restrictor and/or at least one valve 126, in particular at least one temperature-dependent valve and/or at least one pressure-dependent valve and/or at least one temperature-dependent and pressure-dependent valve.

The orifice 130 can in the simplest case be merely at least one opening, for example at least one pipe orifice and/or at least one hole orifice, with a hydraulic diameter. The orifice 130 can be configured in such a way that fluid 174 can be discharged and/or runs off into the fluid sump 116 within a time interval. The opening, in particular a size of a cross-sectional face of the opening, can be configured, for example, in a controllable fashion.

A criterion for actuating the opening can be, for example, a requirement of cooling oil in the fluid sump 116 and/or a fluid level in the gearbox 110.

Fluid 174 can be discharged, for example in a controlled fashion into the fluid sump 116, preferably as a function of a cooling fluid pressure of a clutch cooling means.

The fluid supply system 112 can comprise at least one second fluid outflow 128. The second fluid outflow 128 can preferably not be capable of being closed-loop controlled. The second fluid outflow 128 can comprise at least one orifice 130. In particular, the second fluid outflow 128 can be an orifice-controlled outflow, for example in order to make available all the fluid 174 in the fluid sump 116 for the purpose of starting in the case of long immobilization times.

The gearbox 110 can comprise at least one sensing device 132 for sensing the state variable, in particular at least one pressure sensor 134 and/or at least one rotational speed sensor 136 and/or at least one rotational direction sensor 138.

The sensing device 132 can, for example, be configured to measure, for example in the case of an active actuator, a pressure of the cooling fluid and/or to sense said pressure directly or indirectly. This pressure of the cooling fluid can be used, for example, for closed-loop control of the first fluid outflow 120.

The fluid reservoir 118 can be filled by sprayed fluid 140 and/or by fluid 174 which is diverted by at least one orifice. The fluid supply system 112 can comprise at least one filter 142. The gearbox 110 can comprise at least one gearbox housing 114. The fluid reservoir 118 can be integrated at least partially into the gearbox housing 144.

Alternatively to this, the fluid reservoir 118 can be arranged at least partially outside the gearbox housing 144.

For example, the fluid reservoir 118 can be arranged inside the gearbox housing 144. Alternatively to this, the fluid reservoir 118 can be arranged outside the gearbox housing 144.

For example, the fluid reservoir 118 can be a container in which at least a portion of the fluid 174 can be buffered inside or outside the gearbox housing 144 and can be discharged in a controlled fashion into the fluid sump 116 as a function of a cooling fluid pressure of a clutch cooling means.

The gearbox 110 can comprise at least one actuator or controller 146. The actuator 146 can be connected to the fluid supply system 112, in particular to the valve 126, via at least one interface 148.

The actuator 146 can comprise at least one control output 150. The gearbox 110 can be configured in such a way that the control output 150 simultaneously controls the pump 114 and the first fluid outflow 120, for example the valve 126.

The gearbox 110 and/or the fluid supply system 112 can in particular be configured in such a way that in the event of a failure of the actuator 146 the fluid reservoir 118 runs empty. For example the orifice 130 of the second fluid outflow 128 can always be at least partially opened, and/or in the event of failure the orifice 130 of the first fluid outflow 120 and/or the orifice 130 of the second fluid outflow 128 can be at least partially opened, preferably without active actuation.

In order to achieve an optimum function at different temperatures and/or with different viscosities of the fluid 174, it is possible, for example, to make use of a temperature model. For example, the actuator 146 can comprise a temperature model.

FIG. 1 shows in particular, an exemplary embodiment of the device according to the invention, in which exemplary embodiment the valve 126 can preferably be a directional control valve 152 and/or a flap valve, particularly preferably an actuable directional control valve 152. The directional control valve 152 can be configured, in particular, in such a way that in the case of a high ram pressure in a clutch cooling oil line 154, in particular in the case of a large clutch cooling oil volume flow, the directional control valve 152 is opened, in particular in such a way that a volume of oil which is stored in the fluid reservoir 118 can be discharged and/or runs out from the fluid reservoir 118 into the fluid sump 116 and can be made available as quickly as possible there, for example for the pump which can preferably be configured as a cooling oil pump.

FIG. 1 shows, in particular, a basic illustration of an actuable or controllable fluid reservoir 118.

Figure 2:
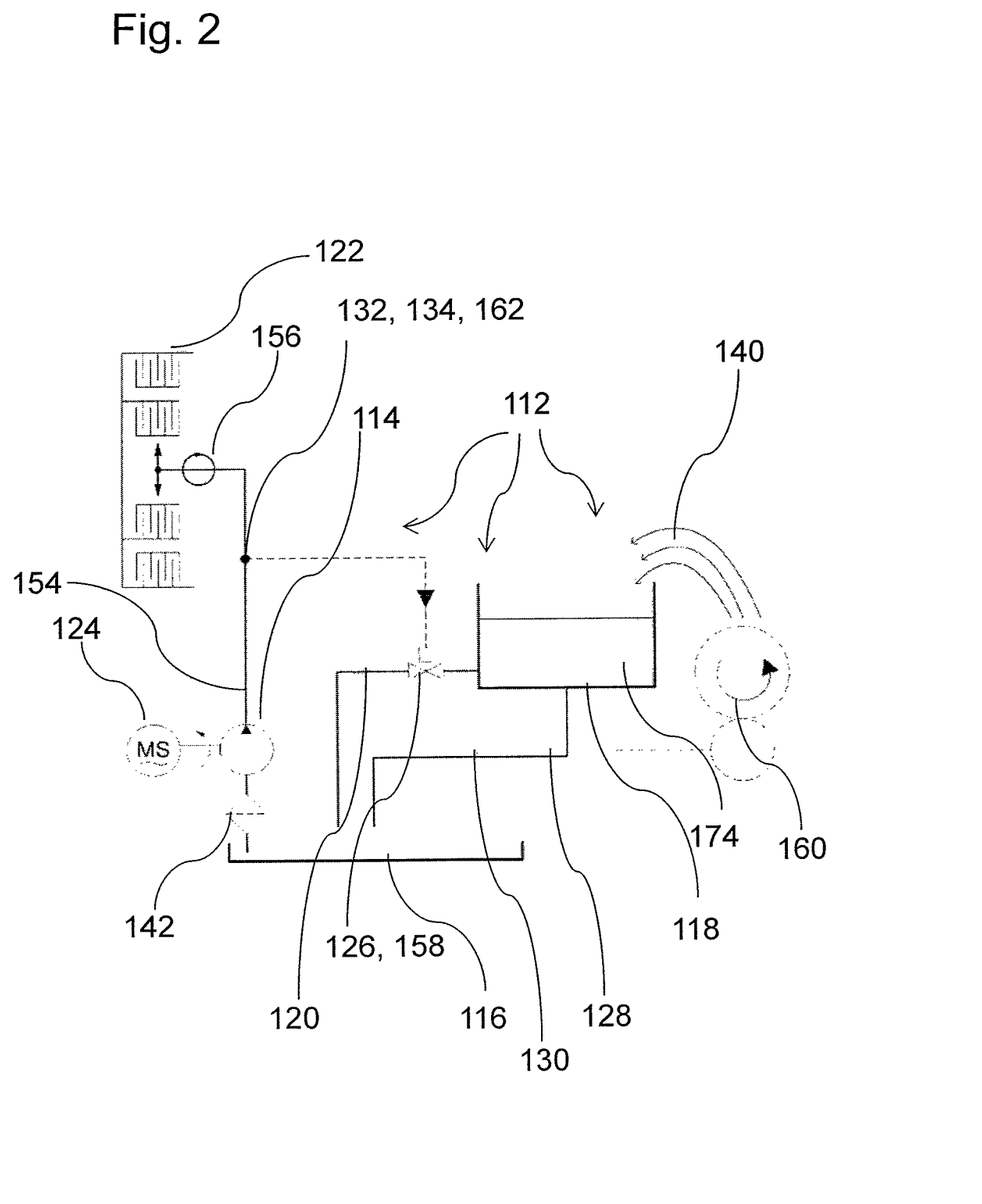
FIG. 2 shows a schematic partial illustration of a second exemplary embodiment of a gearbox according to the invention.

FIG. 2 shows a schematic partial illustration of a second exemplary embodiment of a gearbox 110 according to the invention. The second exemplary embodiment of a gearbox 110 according to the invention can be at least partially configured like the first exemplary embodiment.

The exemplary embodiment illustrated in FIG. 2 can, in particular have at least one electrically commutated electric motor which is configured to pump, with the pump 114, fluid 174 from the fluid sump 116 via the filter 142 and a rotational bushing 156 to the clutch, in particular for cooling the clutch 122, but alternatively or additionally for actuating the clutch 122.

The valve 126 can be, in particular, an actuable valve 158. The fluid reservoir 118 can in this exemplary embodiment be filled by sprayed fluid 140. For example, the fluid reservoir 118 can be filled by sprayed fluid which can be generated by at least one gear wheel set 160 and/or by the clutch 122. The filter 142 can serve, in particular, for filtering the fluid 174.

Figure 3:
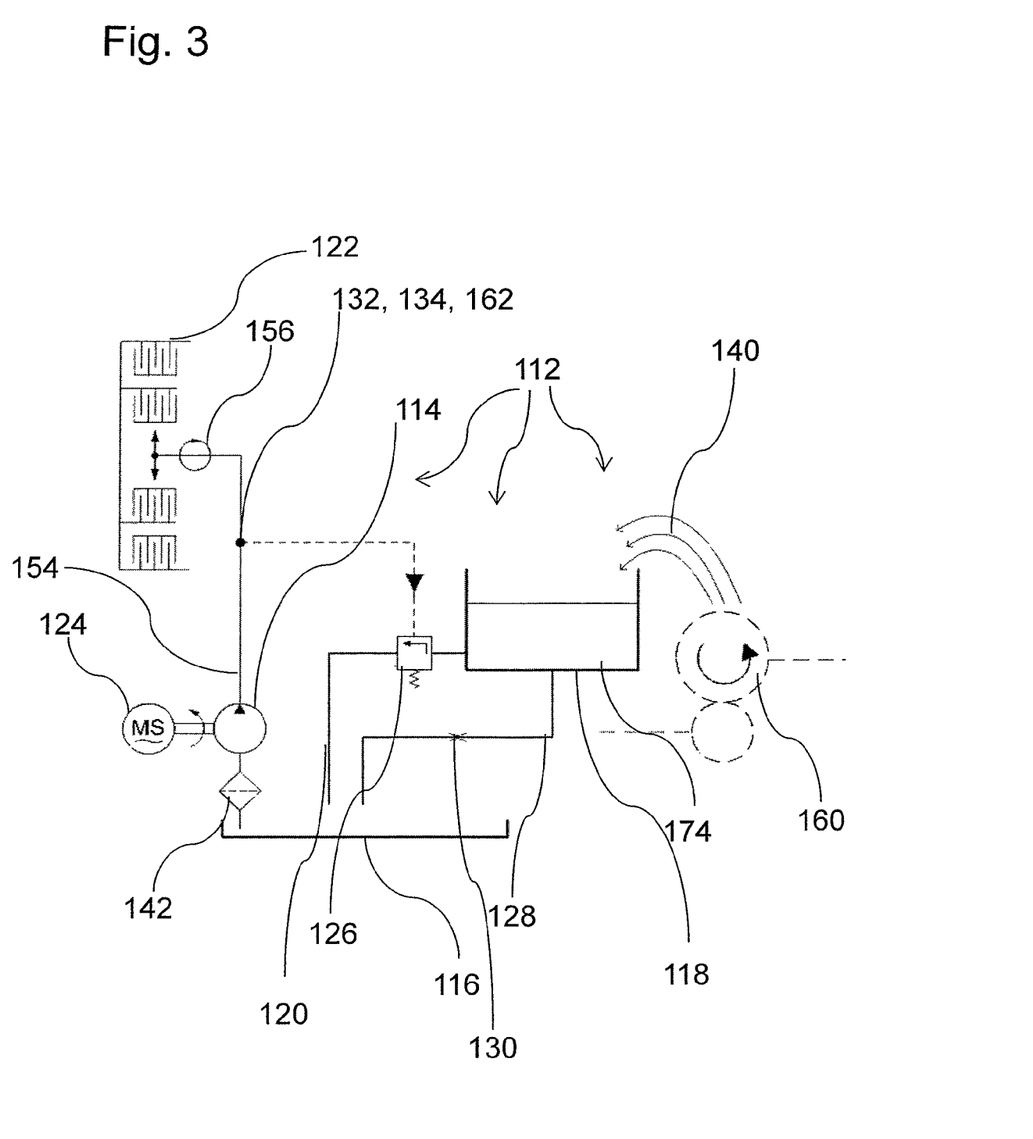
FIG. 3 shows a schematic partial illustration of a third exemplary embodiment of a gearbox according to the invention.

FIG. 3 shows a schematic partial illustration, in particular a hydraulic diagram, of a third exemplary embodiment of a gearbox 110 according to the invention, in particular of an actuable fluid reservoir 118 of the gearbox 110 according to the invention. The third exemplary embodiment of the gearbox 110 according to the invention can be configured at least partially like the first exemplary embodiment of the gearbox 110 according to the invention and/or like the second exemplary embodiment of the gearbox 110 according to the invention.

A pressure $\Delta p$ in a supply line leading to the clutch 162 can usually be determined by a hydraulic resistance $R_v$ of the subsequent components, for example by the hydraulic resistance of the rotational bushing 156 and/or of the longitudinal section as far as the clutch 122, for example by the relationship $\Delta p = R_v * I_v$, where $I_v$ is a volume flow.

Figure 6:
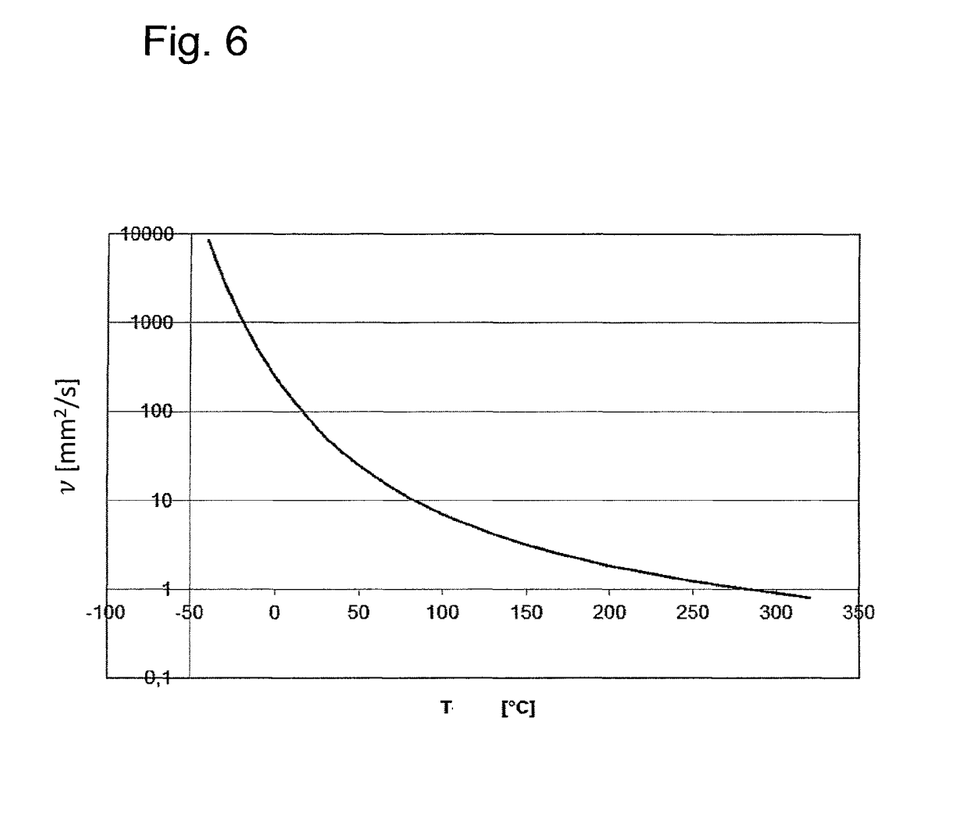
FIG. 6 shows a fluid viscosity profile with respect to a temperature model.

The hydraulic resistance $R_v$ can depend on at least two operating parameters, for example on the volume flow $I_v$, in particular on the volume flow through the subsequent components such as, for example, the clutch cooling fluid volume flow and the viscosity of the fluid 174, in particular of the gearbox fluid. The viscosity can usually depend on the temperature, such as is illustrated by way of example in FIG. 6. FIG. 6 shows, in particular, a typical profile of a kinematic viscosity $v$ in $mm^2/s$ of a gearbox fluid as a function of a temperature T in ° C.

If, for example, the valve 126, which is, in particular, a releasable valve, were to be set to a fixed pressure, in particular a pressure value, for example a threshold value for a pressure and/or an opening pressure, this opening pressure could already be reached in the case of cold fluid 174 at a relatively low volume flow, in particular a lower feed volume flow than in the case of a warm fluid 174. In the case of a very low kinematic viscosity, in particular in the case of a low oil viscosity, for example as a result of a high temperature, the opening pressure could possibly no longer be reached at all.

This problem can be at least partially solved or mitigated by virtue of the fact that, for example, the valve 126 can be a temperature-dependent valve 164 and/or at least one temperature model is used and/or by virtue of the fact that the valve 126 can be triggered by means of electrical activation.

Figure 4:
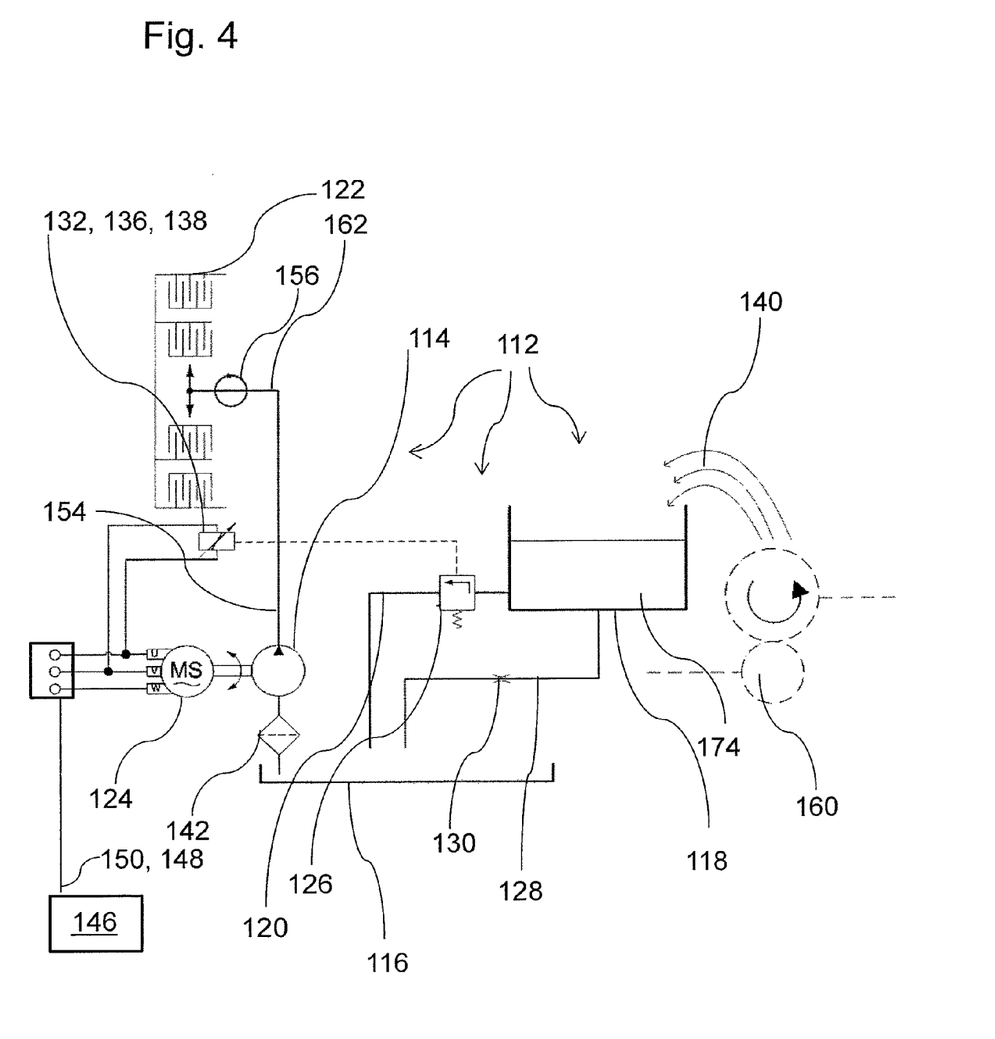
FIG. 4 shows a schematic partial illustration of a fourth exemplary embodiment of a gearbox according to the invention.

FIG. 4 shows a schematic partial illustration of a fourth exemplary embodiment of a gearbox 110 according to the invention. The fourth exemplary embodiment of a gearbox 110 according to the invention can be configured at least partially like the other exemplary embodiments, in particular like the first exemplary embodiment.

The fourth exemplary embodiment can comprise, in particular, a valve which can be triggered by means of electrical activation. The fourth exemplary embodiment can, as is illustrated in FIG. 4, comprise, in particular, an actuable valve 158, for example an actuable discharge valve, in particular with electrical activation and at least one sensing device 132. The valve 126 can preferably be activated by evaluation of the method of functioning of the motor, preferably of the electric motor, by means of the sensing device 132.

The valve 126, in particular the discharge valve, can be triggered, in particular, indirectly, in particular by means of the electrical activation. The valve 126 and/or the first fluid outflow 120 can, in particular, be actuable by evaluating the rotational speed of the pump 114 and/or of the motor, in particular of the electric pump motor 124, and/or by evaluating the rotational direction of the pump 114 and/or of the motor, in particular of the electric pump motor 124.

Figure 7:
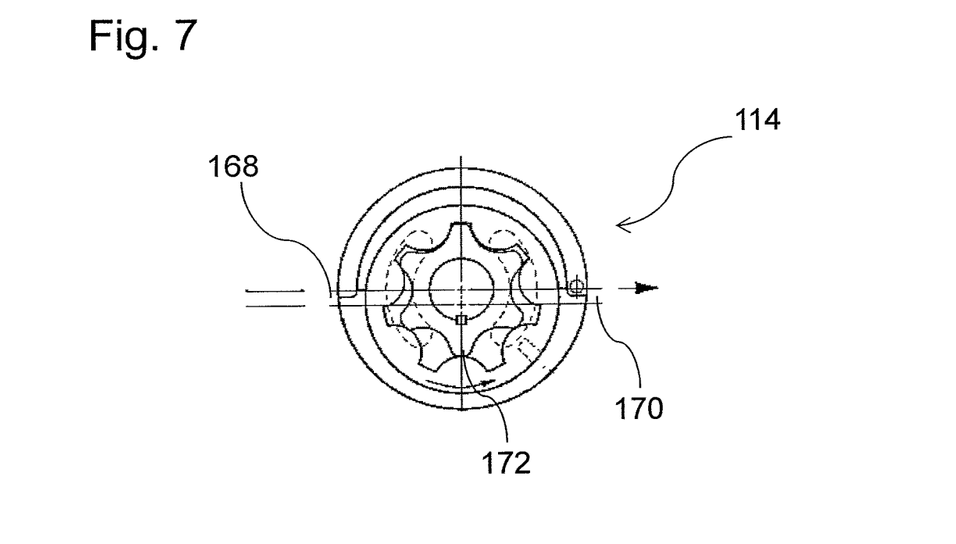
FIG. 7 shows a schematic illustration of an internal gear wheel pump with a reversal ring in a first rotational position.
Figure 8:
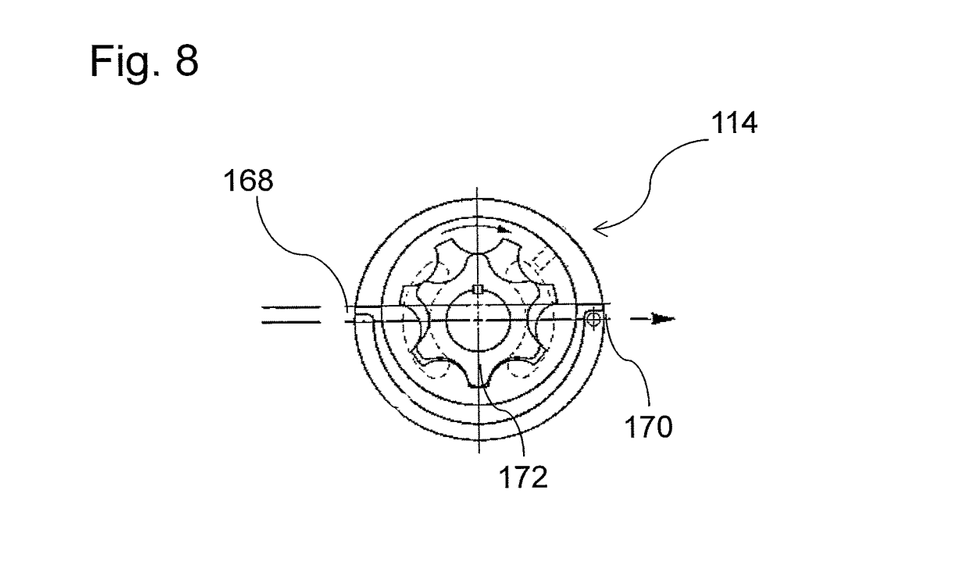
FIG. 8 shows a schematic illustration of an internal gear wheel pump with a reversal ring in a second rotational position.

The pump 114 can comprise, in particular, at least one reversal ring 166, as illustrated in FIGS. 7 and 8. The pump 114 can comprise at least a first opening 168 and at least a second opening 170. The first opening 168 can preferably be an intake opening. The second opening 170 can preferably be an outflow opening. The pump 114, in particular an electromagnetically driven cooling oil pump, can preferably comprise at least one pump wheel set 172, preferably when an evaluation of the rotational direction of the pump 114 is used.

The pump 114, in particular the pump wheel set 172, can configured in such a way that a pump function of the electric motor, in particular from the fluid sump 116 to the clutch 112, can be maintained even given a changing rotational direction of the pump, in particular the drive rotational direction, in such a way that a direction of a fluid flow is therefore preferably not reversed if the rotational direction of the pump changes.

The pump 114 can be, in particular a pump 114 as described in the German Patent Application by the Applicant of the present application which was published after the priority date of the present document and has the number DE 10 2013 110 400.2 or in DE 10 2011 122 642 A1. The reversal ring 166 can, in particular, be configured in such a way that the pump direction can be maintained even given a change of rotational direction of the pump 114, in particular a change in drive rotational direction.

Figure 5:
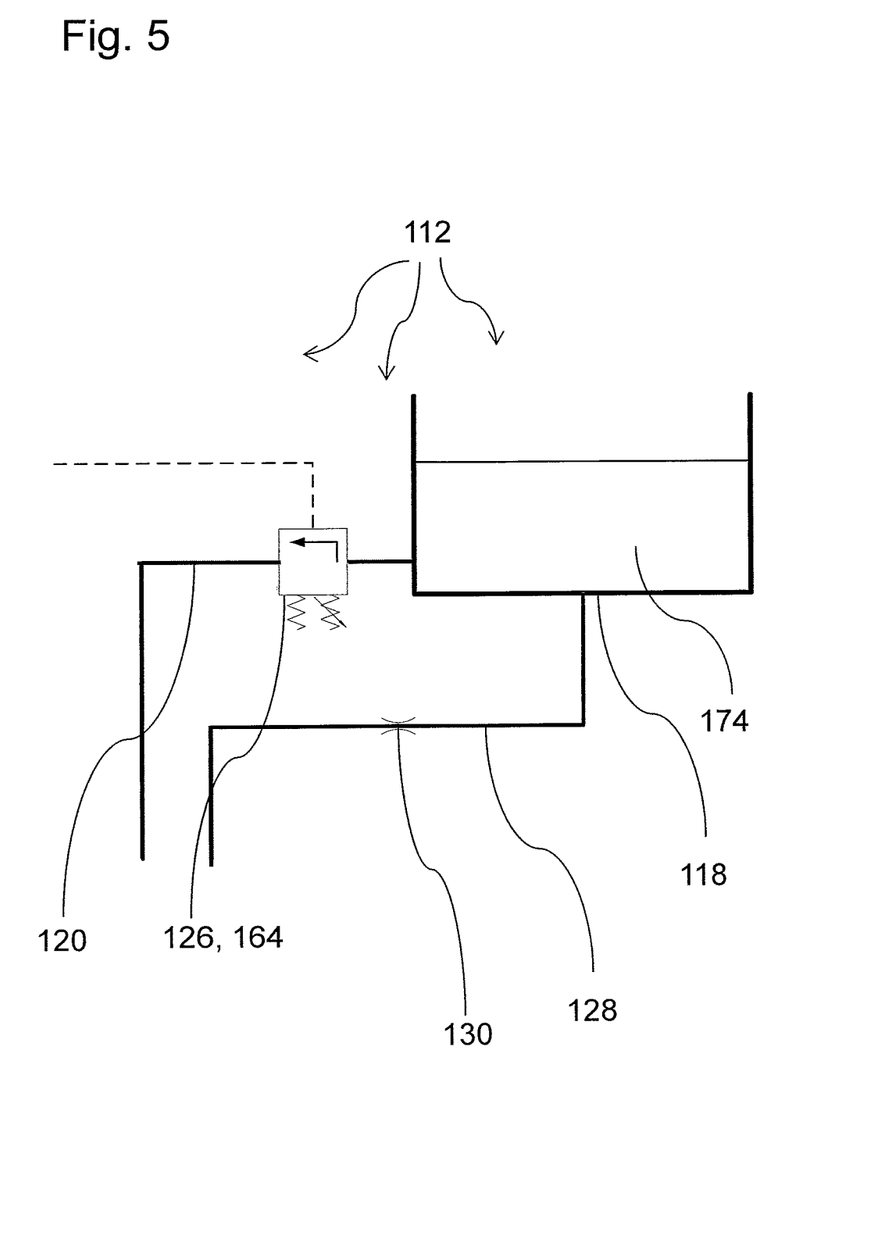
FIG. 5 shows a schematic partial illustration of a fifth exemplary embodiment of a gearbox according to the invention.

FIG. 5 shows a schematic partial illustration of a fifth exemplary embodiment of a gearbox 110 according to the invention. The fifth exemplary embodiment of a gearbox 110 according to the invention can be configured at least partially like the other exemplary embodiments. The valve 126 can have, for example, at least one temperature-dependent element, for example at least one element with a temperature-dependent spring constant, in particular in order to permit adaptation of a pressure for opening the valve 126, for example an opening pressure, to a temperature-dependent viscosity of the fluid 174, in particular of the cooling oil. The element with a temperature-dependent spring constant can comprise, for example, at least one bimetal spring. The valve 126 can, for example, have at least one bimetal spring alternatively or additionally to a normal, essentially temperature-independent spring. The valve 126 can be, for example, a thermostat valve and/or the valve 126 can comprise at least one thermostat valve. The fifth exemplary embodiment can comprise as valve 126, in particular, a temperature-dependent valve 164. The temperature-dependent valve 126 can be, for example, an actuable discharge valve with a temperature-dependent pressure threshold.

In a further aspect of the present invention, a method for operating the gearbox 110 according to the invention is proposed as described above. The gearbox 110 comprises at least one fluid supply system 112. The fluid supply system 112 comprises at least one pump 114. The fluid supply system 112 comprises at least one fluid sump 116. The fluid supply system 112 comprises at least one fluid reservoir 118. The fluid reservoir 118 comprises at least a first fluid outflow 120 leading into the fluid sump 116. The first fluid outflow 120 is controlled as a function of a state variable.

The gearbox 110 can comprise at least one controller/actuator 146. The actuator 146 can be configured to carry out the method according to the invention. The method can be executed, for example, at least partially by the actuator 146.

LIST OF REFERENCE NUMBERS

110 Gearbox
112 Fluid supply system
114 Pump
116 Fluid sump
118 Fluid reservoir
120 First fluid outflow
122 Clutch
124 Pump motor
126 Valve
128 Second fluid outflow
130 Orifice
132 Sensing device
134 Pressure sensor
136 Rotational speed sensor
138 Rotational direction sensor
140 Sprayed fluid
142 Filter
144 Gearbox housing
146 Controller/Actuator
148 Interface
150 Control output
152 Directional control valve
154 Clutch cooling fluid line
156 Rotational bushing
158 Actuable valve
160 Gear wheel set
162 Supply line to the clutch
164 Temperature dependent valve
166 Reversal ring
168 First opening
170 Second opening
172 Pump wheel set
174 Fluid

What is claimed is:

1. A gearbox for a motor vehicle, wherein the gearbox comprises at least one fluid supply system, wherein the fluid supply system comprises at least one pump, wherein the fluid supply system comprises at least one fluid sump, wherein the fluid supply system comprises at least one fluid reservoir, wherein the fluid reservoir comprises at least a first fluid outflow leading into the fluid sump, wherein the first fluid outflow can be controlled as a function of a state variable, wherein the fluid supply system comprises at least a second fluid outflow, wherein the second fluid outflow cannot be regulated.

2. The gearbox according to claim 1, wherein the gearbox comprises at least one clutch.

3. The gearbox according to claim 1, wherein the state variable is a fluid supply variable, wherein the fluid supply variable comprises at least one variable selected from: a fluid pressure; a fluid volume flow; a rotational speed of the pump; a rotational speed of a pump motor; a rotational direction of the pump; a rotational direction of the pump motor; a fluid requirement and a banking-up pressure.

4. The gearbox according to claim 1, wherein the first fluid outflow is controllable at least one of actively and passively.

5. The gearbox according to claim 1, wherein the first fluid outflow comprises one or more orifices or one or more restrictors.

6. The gearbox according to claim 1, wherein the first fluid outflow comprises at least one valve.

7. The gearbox according to claim 6, wherein the valve includes a temperature-dependent valve.

8. The gearbox according to claim 6, wherein the valve includes a pressure-dependent valve.

9. The gearbox according to claim 6, wherein the valve includes a temperature-dependent and pressure-dependent valve.

10. The gearbox according to claim 1, wherein the gearbox comprises at least one sensing device for sensing the state variable.

11. The gearbox according to claim 10, wherein the sensing device includes a pressure sensor.

12. The gearbox according to claim 10, wherein the sensing device includes a rotational speed sensor.

13. The gearbox according to claim 10, wherein the sensing device includes rotational direction sensor.

14. The gearbox according to claim 1, wherein the fluid reservoir can be filled by means of at least one of sprayed fluid and fluid diverted by at least one orifice.

15. The gearbox according to claim 1, wherein the fluid supply system comprises at least one filter.

16. The gearbox according to claim 1, wherein the gearbox comprises at least one gearbox housing, wherein the fluid reservoir is at least partially integrated into the gearbox housing.

17. The gearbox according to claim 1, wherein the gearbox comprises at least one actuator.

18. The gearbox according to claim 17, wherein the actuator comprises at least one control output, wherein the gearbox is configured in such a way that the control output simultaneously controls the pump and the first fluid outflow.

\* \* \* \* \*